E. G. LIFVENDAHL, Sr.
ADJUSTABLE BAND SAW GUIDE.
APPLICATION FILED JUNE 9, 1921.
1,432,564.
Patented Oct. 17, 1922.
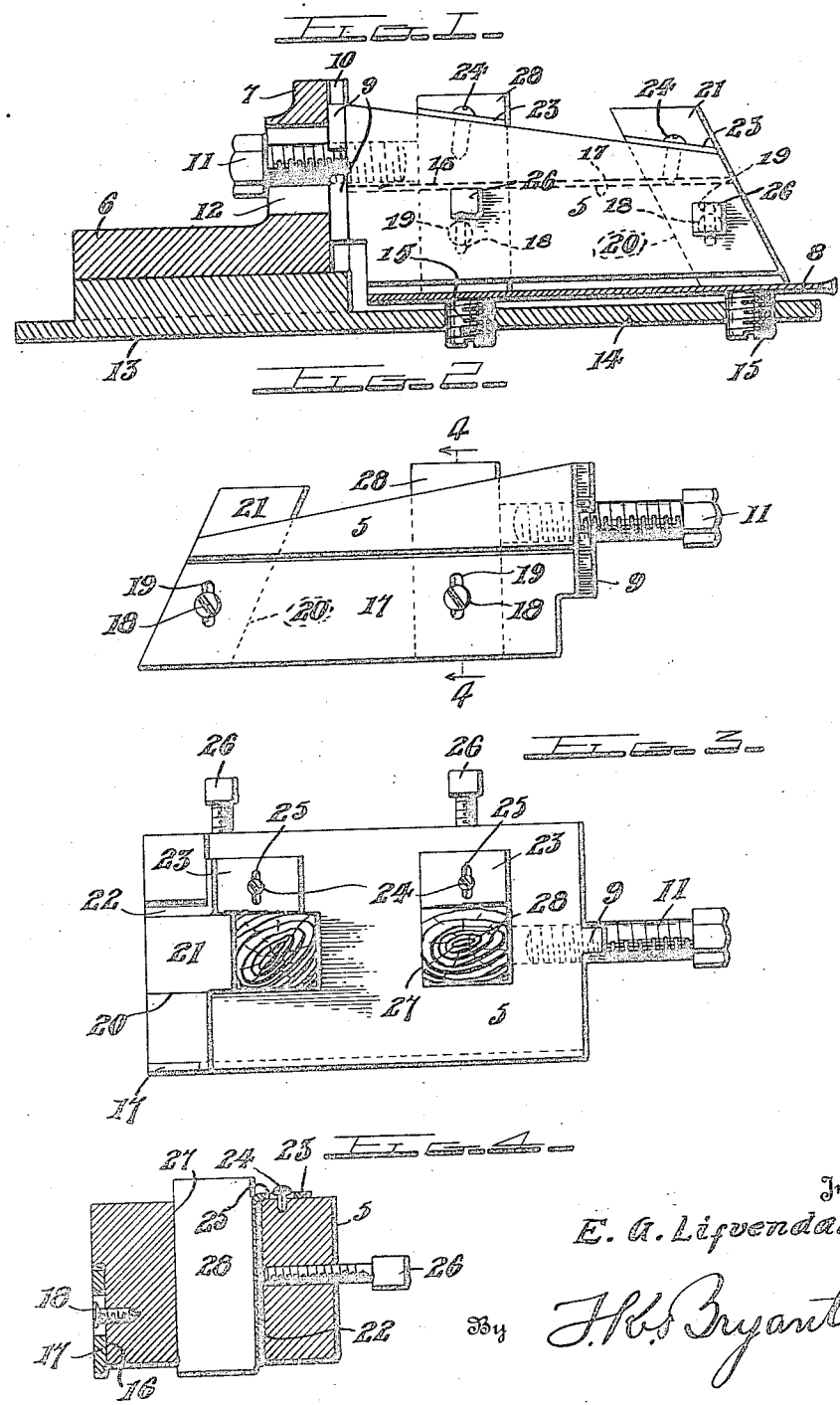
Inventor
E. G. Lifvendahl, Sr.
By J. K. & Bryant.
Attorney Patented Oct. 17, 1922.

1,432,564

UNITED STATES PATENT OFFICE.

ERIC GUSTAF LIFVENDAHL, SR., OF ANACORTES, WASHINGTON.

ADJUSTABLE BAND-SAW GUIDE.

Application filed June 9, 1921. Serial No. 476,219.

*To all whom it may concern:*

Be it known that I, ERIC GUSTAF LIFVENDAHL, Sr., a citizen of the United States of America, residing at Anacortes, in the county of Skagit and State of Washington, have invented certain new and useful Improvements in Adjustable Band-Saw Guides, of which the following is a specification.

The object of the present invention is to improve the construction of saw guides, and to provide an adjustable guide particularly useful for the band saws of horizontal band resawing machines.

With this and other objects in view, the present invention consists in the novel form, combination and arrangement of parts hereinafter more fully described, shown in the accompanying drawings and claimed, In the drawings wherein like reference characters refer to corresponding parts throughout the several views, Figure 1 is a detail sectional view taken longitudinally through saw guide and transversely of the saw band, Figure 2 is a side elevational view of the upper guide member of the saw guide shown in Figure 1, Figure 3 is a top plan view thereof, and Figure 4 is a vertical sectional view taken upon line IV—IV of Figure 2.

Referring more in detail to the several views, the present invention mainly resides in improving the construction of the upper guide member of the saw guide, which upper member is generally denoted by the numeral 5 and which may be associated with a support 6 having a vertical portion 7 located at one side of the band saw 8 and arranged above the plane of the latter, the upper guide member 5 having one end fitted against and adjustably secured to the vertical portions 7 of the support and movable upwardly and downwardly toward and from the band saw. This is accomplished by providing the guide member 5 with a vertical rib 9 for slidable reception within a groove 10 of the vertical portion 7, a screw 11 being passed through a vertical elongated slot 12 of the portion 7 and being threaded into the adjacent end of the guide member 5. In guides of the present kind, a lower guide member 13 is usually connected with the bottom of the support 6 and has a portion 14 extending beneath the saw 8, which portion may be provided with adjustable saw supporting screw 15 if desired.

The construction thus far described is substantially the same as that of saw guides heretofore employed with the exception of the provision of the rib 9 and groove 10, which elements are provided to hold the upper guide member 5 against lateral tilting movements as well as to assist the screw 11 in bracing said guide member against lateral strains which is particularly necessary when said guide member is formed of a block of cast iron or other metal as in the present device.

As above stated, the upper guide member 5 includes a cast iron body and this body is rabetted at one side as at 16, a brass guide plate 17 being held in this cut out or rabbetted portion by means of suitable screws 18 extending through vertical elongated slots 19 in the guide plate or blade 17 and threaded into the body of the upper guide member, the slots 19 providing for vertical adjustment of the plate 17, the desired distance below the bottom surface of the body.

The body of the upper guide member is provided with a groove inclined to the vertical as at 20 at its forward end, and a hard wood guide pin 21 is slidably disposed in this groove so as to engage at its lower end with the adjacent surface of the saw band 8 near the toothed edge of the latter. A metal plate 22 is disposed within the groove 20 beside the guide pin 21 and its upper end portion 23 extends at right angles so as to rest upon the upper surface of the body of the guide member 5, a screw 24 being threaded into the body of the guide member and extending through a transversely elongated slot 25 in the end 23 so as to guide the plate 22 for transverse movements. A set screw 26 is threaded through one side of the guide member so as to have its inner end bear upon the plate 22 and it will be seen that by adjusting the set screw 26, the guide pin 21 will be effectively held against movement in the groove 20 with the lower end of said guide pin the required distance below the bottom surface of the guide member body. The object of the plate 22 is to provide a flat metal bearing for engaging the greater portion of one side of the pin 21 and to receive the direct contact of the screw 26 so that the guide pin is effectively held against accidental movement in the body and the guide pin is protected from being damaged by said screw 26.

A vertical opening 27 is provided vertically through the body of the guide member 5 rearwardly of the groove 20, and another hard wood guide pin 28 is slidably disposed therethrough, the guide pin 28 being similarly associated with a set screw 26 and a metallic plate 22 with one flanged upper end 23 adjustably connected to the body by means of a screw 24 passing through a slot 25 in said end 23.

In the use of the device, the two hard wood guide pins 21 and 28 are placed in such position that they barely touch the saw, the pin 28 being near the back of the saw and the pin 21 being near the toothed edge of the latter, both guide pins being even with the bottom or the projecting edge of the guide blade 17 which projects slightly below the bottom surface of the body of the guide member 5. The central portion of the saw is thus left free where the least pressure or wear is had. Thus, the guide pins are only at spaced points upon the saw band and as soon as they wear, they can be readily lowered as necessary indepently of any other part of the upper guide member or of the entire guide. The object of the brass guide blade 17 is that it is of such metal and so arranged that should the saw back-up or be forced by the timbers, said blade will not break or dull the saw.

It is believed that the construction and manner of use as well as the advantages of the present invention will be readily understood and appreciated from the foregoing description.

Minor changes may be made without departing from the spirit and scope of the invention as claimed.

What is claimed as new is:

1. An upper guide member for band saw guides comprising a block having passageways extending therethrough, hard wood guide pins slidably mounted for substantially vertical movement in said passageways, means to maintain the pins in adjusted position, and a guide blade attached to one side of the body and adjustable vertically relative to the latter so as to project below the bottom surface of said body.

2. In a band saw guide, an upper guide member having means for attaching the same to a support for vertical adjustment relative to said support and including a body member with hard wood guide pins adjustable substantially vertically therethrough, and a vertically adjustable guide blade carried by the body member alongside of said guide pins.

3. In a band saw guide, an upper guide member having means for attaching the same to a support for vertical adjustment relative to said support and including a body member with hard wood guide pins adjustable substantially vertically therethrough, and a vertically adjustable guide blade carried by the body member alongside of said guide pins, said body being rabbetted along one side, and said guide blade being positioned within said rabbetted portion of the body.

In testimony whereof I affix my signature.

ERIC GUSTAF LIFVENDAHL, Sr.